(12) United States Patent
Auyeung et al.

(10) Patent No.: US 11,711,515 B2
(45) Date of Patent: *Jul. 25, 2023

(54) CODING METHOD AND SYSTEM WITH IMPROVED TRANSFORM DOMAIN COEFFICIENT COMPUTATION

(71) Applicant: Tencent America LLC, Palo Alto, CA (US)

(72) Inventors: Cheung Auyeung, Sunnyvale, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,443

(22) Filed: Apr. 19, 2022

(65) Prior Publication Data

US 2022/0248023 A1    Aug. 4, 2022

Related U.S. Application Data

(63) Continuation of application No. 17/079,421, filed on Oct. 24, 2020, now Pat. No. 11,336,891.

(60) Provisional application No. 62/940,034, filed on Nov. 25, 2019.

(51) Int. Cl.
*H04N 19/00* (2014.01)
*H04N 19/129* (2014.01)
*H04N 19/70* (2014.01)

(52) U.S. Cl.
CPC .......... *H04N 19/129* (2014.11); *H04N 19/70* (2014.11)

(58) Field of Classification Search
CPC ....... H04N 19/129; H04N 19/70; H04N 19/91
See application file for complete search history.

(56) References Cited

U.S. PATENT DOCUMENTS

| | | | | |
|---|---|---|---|---|
| 8,280,641 B1* | 10/2012 | Pellionisz | ............... | G16B 30/00 |
| | | | | 702/19 |
| 8,477,888 B2* | 7/2013 | Lu | ......................... | H04B 17/345 |
| | | | | 375/346 |
| 2006/0268933 A1* | 11/2006 | Kellerer | ................... | H04L 67/14 |
| | | | | 370/469 |
| 2010/0246686 A1* | 9/2010 | Pezeshk | ............ | G11B 20/10277 |
| | | | | 375/240.25 |
| 2019/0213915 A1* | 7/2019 | Tan | .......................... | G06F 40/42 |

(Continued)

OTHER PUBLICATIONS

Jianle Chen et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, Oct. 2019, JVET-P2002-v1. 89 pages.

(Continued)

*Primary Examiner* — Frank F Huang
(74) *Attorney, Agent, or Firm* — Anova Law Group PLLC

(57) ABSTRACT

A video encoding method includes obtaining a video bitstream; encoding the video bitstream based on a residual coding scheme and signaling information; and outputting the encoded video bitstream. Encoding the video bitstream includes: obtaining residual information associated with the video bitstream, wherein the residual information includes at least a remainder; obtaining a transform coefficient based on a current state, a Rice parameter, and a next state; and encoding the residual information based on the transform coefficient.

20 Claims, 9 Drawing Sheets

(56) References Cited

U.S. PATENT DOCUMENTS

2020/0294401 A1* 9/2020 Kerecsen ............. G05D 1/0287
2021/0160506 A1* 5/2021 Auyeung ............... H04N 19/70
2021/0212606 A1* 7/2021 Tran ..................... A61B 5/0024

OTHER PUBLICATIONS

Benjamin Bross et al., "Versatile Video Coding (Draft 7)", Joint Video Experts Team (JVET) of ITU-T SG 16 WP 3 and ISO/IEC JTC 1/SC 29/WG 11, Oct. 2019, JVET-P2001-vE. 488 pages.

* cited by examiner

CODING METHOD AND SYSTEM WITH IMPROVED TRANSFORM DOMAIN COEFFICIENT COMPUTATION

CROSS REFERENCES TO RELATED APPLICATIONS

This application is a continuation of U.S. patent application Ser. No. 17/079,421, filed on Oct. 24, 2020, which claims priority to U.S. provisional patent application No. 62/940,034, filed on Nov. 25, 2019, contents of both of which are incorporated by reference in their entirety.

FIELD OF THE TECHNOLOGY

This application relates to the field of video technologies and, specifically, to a method and a system for decoding transform domain coefficients.

BACKGROUND

Under current versatile video coding (VVC) standard, a block of residual pixels can be entropy coded in spatial domain or in transform domain. When a block of residual pixels is entropy coded in transform domain, computation in the derivation of Rice parameter is required for a syntax element abs_remainder[n]. The abs_remainder[n] is the remaining absolute value of a transform coefficient level that is coded with Golomb-Rice code at the scanning position n. When abs_remainder[n] is not present, it is inferred to be equal to 0. The Golomb-Rice code is parameterized by a parameter called Rice parameter.

However, the computation in the derivation of Rice parameter for abs_remainder[n] requires a substantial number of memory access and arithmetic operations, which is often computational costly. The disclosed methods and systems are directed to solve one or more problems set forth above and other problems.

SUMMARY

One aspect of the present disclosure includes a decoding method. The method includes obtaining an encoded bitstream of an original video content; decoding the encoded bitstream based on a residual coding scheme and signaling information; and outputting the original video content, wherein decoding the encoded bitstream includes: obtaining encoded residual information associated with the encoded bitstream, wherein the encoded residual information includes at least an encoded remainder, and performing a decoding process on the encoded residual information to obtain a transform domain coefficient based on a current state, a Rice parameter, and a next state.

Another aspect of the present disclosure includes a non-transitory computer-readable storage medium. The non-transitory computer-readable storage medium stores computer program instructions executable by at least one processor to perform: obtaining an encoded bitstream of an original video content; decoding the encoded bitstream based on a residual coding scheme and signaling information; and outputting the original video content, wherein decoding the encoded bitstream includes: obtaining encoded residual information associated with the encoded bitstream, wherein the encoded residual information includes at least an encoded remainder, and performing a decoding process on the encoded residual information to obtain a transform domain coefficient based on a current state, a Rice parameter, and a next state.

Another aspect of the present disclosure includes a Markov decision process decoding method. The method includes obtaining a sequence of a preset number of uniquely decodable codes; initializing a current state and a counting number, including setting the current state to a preset value and setting the counting number to 1; and decoding the sequence of the preset number of uniquely decodable codes by repeatedly: determining whether the counting number exceeds the preset number, and in response to that the counting number is smaller than or equal to the preset number, determining a parameter according to the current state, decoding the parameter to obtain a current value, determining a next state according to the current state and the current value, adding 1 to the counting number, and replacing the current state with the next state.

Another aspect of the present disclosure provides a video encoding method includes: obtaining a video bitstream; encoding the video bitstream based on a residual coding scheme and signaling information; and outputting the encoded video bitstream. Encoding the video bitstream includes: obtaining residual information associated with the video bitstream, wherein the residual information includes at least a remainder; obtaining a transform coefficient based on a current state, a Rice parameter, and a next state; and encoding the residual information based on the transform coefficient.

Another aspect of the present disclosure includes a non-transitory computer-readable storage medium. The non-transitory computer-readable storage medium stores computer program instructions executable by at least one processor to perform: obtaining a video bitstream; encoding the video bitstream based on a residual coding scheme and signaling information; and outputting the encoded video bitstream. Encoding the video bitstream includes: obtaining residual information associated with the video bitstream, wherein the residual information includes at least a remainder; obtaining a transform coefficient based on a current state, a Rice parameter, and a next state; and encoding the residual information based on the transform coefficient.

Other aspects of the present disclosure can be understood by those skilled in the art in light of the description, the claims, and the drawings of the present disclosure.

DETAILED DESCRIPTION

Figure 1:
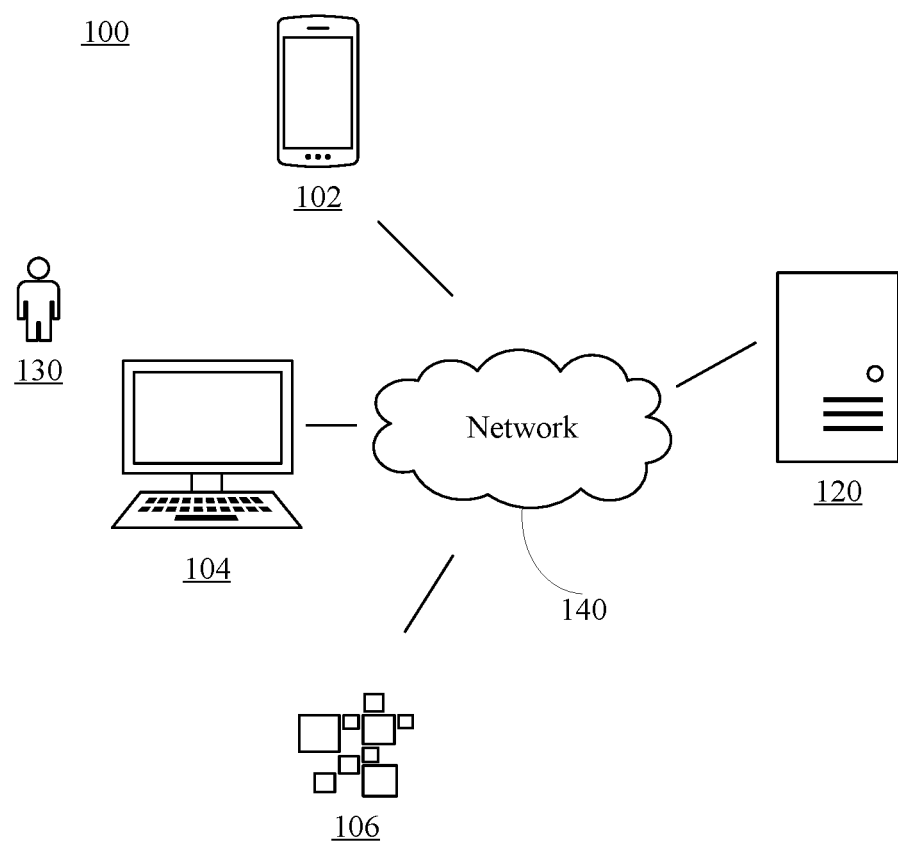
FIG. 1 illustrates an operating environment incorporating certain embodiments of the present disclosure.

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure.

Certain terms used in this disclosure are first explained in the followings. Other acronyms and/or terms not listed may be found from a VVC standard or other related documents.

HEVC: High Efficiency Video Coding
HDR: high dynamic range
SDR: standard dynamic range
VVC: Versatile Video Coding
JVET: Joint Video Exploration Team
CU: Coding Unit
VTM: Versatile Video Coding Test Model
CG: Coefficient Group
PU: Prediction Unit
MTS: Multiple Transform Selection
EMT: Enhanced Multiple Transform
AMT: Adaptive Multiple Transform
SVT: Spatially Varying Transform
SBT: Sub-block Transform
VPS: Video Parameter Set
PPS: Picture Parameter Set
SPS: Sequence Parameter Set
IDT: Identity transform
TSM: Transform Skip Mode
IBC: Intra Block Copy
LFNST: Low-Frequency Non-Separable Secondary Transform, or Low-Frequency Non-Separable Transform
RST: Reduced-Size Transform
NSST: Non-Separable Secondary Transform
CCLM: Cross-Component Linear Model
ISP: Intra Sub-Partitioning
MIP: Matrix-based Intra Prediction Mode
MRL (or MRLP): Multiple reference line prediction
COT: Compound Orthonormal Transform
KLT: Karhunen-Loève Transform
IBDI: Internal Bit Depth Increase
DPB: Decoded Picture Buffer
MIP: Matrix-based Intra Prediction
CCALF: Cross-Component Adaptive Loop Filter
Bitstream: A sequence of bits, in the form of a NAL unit stream or a byte stream, that forms the representation of coded pictures and associated data forming one or more CVS. VVC standard: A currently published version (e.g., JVET-R2001) of the Specification of VVC, which is incorporated herein by reference.
Adaptation parameter set (APS): A syntax structure containing syntax elements that apply to zero or more slices as determined by zero or more syntax elements found in slice headers.
Adaptive loop filter (ALF): A filtering process that is applied as part of the decoding process and is controlled by parameters conveyed in an APS.
ALF APS: An APS that controls the ALF process
Chroma: An adjective, represented by the symbols Cb and Cr, specifying that a sample array or single sample is representing one of the two color difference signals related to the primary colors.
Coded picture: A coded representation of a picture comprising VCL NAL units with a particular value of nuh_layer_id within an access unit and containing all CTUs of the picture.
Coding tree block (CTB): An N×N block of samples for some value of N such that the division of a component into CTBs is a partitioning.
Coding tree unit (CTU): A CTB of luma samples, two corresponding CTBs of chroma samples of a picture that has three sample arrays, or a CTB of samples of a monochrome picture or a picture that is coded using three separate colour planes and syntax structures used to code the samples.
Golomb Codes: Golomb codes is a family of data compression codes invented by Solomon Golomb, and a Golomb code has a tunable parameter that can be any positive integer value.
Golomb Coding: Golomb coding is a lossless data compression method using Golomb codes.
Golomb-Rice Coding: Golomb-Rice coding, often referred as to Rice coding, is a specialized form of Golomb coding, where the tunable parameter is a power of two.
Rice Parameter: Rice parameter is a parameter used to define Golomb codes for coefficient level coding.
Markov Decision Process (MDP): The Markov Decision Process (MDP) is a discrete-time stochastic control process, and at each time step, the MDP includes determining the current state, and executing an available action in the current state.
Transform Skip Mode (TSM): A mode proposed for HEVC, where a transform on the prediction residual is skipped in one or both directions.
Inter prediction: A prediction derived in a manner that is dependent on data elements (e.g., sample values or motion vectors) of one or more reference pictures.
Intra prediction: A prediction derived from only data elements (e.g., sample values) of the same decoded slice without referring to a reference picture.
Luma: An adjective, represented by the symbol or subscript Y or L, specifying that a sample array or single sample is representing the monochrome signal related to the primary colours.
Motion vector: A two-dimensional vector used for inter prediction that provides an offset from the coordinates in the decoded picture to the coordinates in a reference picture.
Parameter: A syntax element of a sequence parameter set (SPS) or picture parameter set (PPS), or the second word of the defined term quantization parameter.
Sequence parameter set (SPS): A syntax structure containing syntax elements that apply to zero or more entire CLVSs as determined by the content of a syntax element found in the PPS referred to by a syntax element found in each picture header.
Syntax element: An element of data represented in the bitstream.
Syntax structure: Zero or more syntax elements present together in the bitstream in a specified order.

FIG. 1 shows an operating environment 100 incorporating certain embodiments of the present disclosure. As shown in FIG. 1, the operating environment 100 may include a variety of devices with video functionalities. For example, the operating environment 100 may include a mobile device 102, a terminal device 104, and an electronic device 106. Other types of devices may also be included.

The operating environment 100 may also include a server 120, one or more users 130, and a communication network 140 connecting the variety of devices and the server 120. The user(s) 130 may use, access, or control one or more of the variety of devices.

The mobile device 102, the terminal device 104, and the electronic device 106 may be generally referred as a terminal device or simply a terminal, which may include any user terminal, such as a personal digital assistant (PDA), a mobile phone, a smart phone, an integrated messaging device (IMD), a tablet computer, a notebook computer, a desktop computer, and other computing devices. The terminal device may also include any image or video capturing devices, such as a digital camera, a video camera, a security camera, a vehicle on-board camera, and a stereo camera, etc., or any electronic device with a video function, such as a digital doorbell, an autonomous driving sensor, a digital voice assistant, a smart speaker, a smart appliance, or any industrial or commercial IoT systems with video processing capability. Any of the mobile device 102, terminal device 104, and electronic device 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

The network 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The network 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

The server 120 may include any type of server computer system or multiple computer systems configured in a server cluster or distributed in different locations. The server 120 may also include a cloud server on a cloud computing platform. The server 120 may also be referred as a server entity, which may be integrated with any appropriate device (including the electronic device) for performing the disclosed server-side functionalities of video decoding and application processing.

Figure 2:
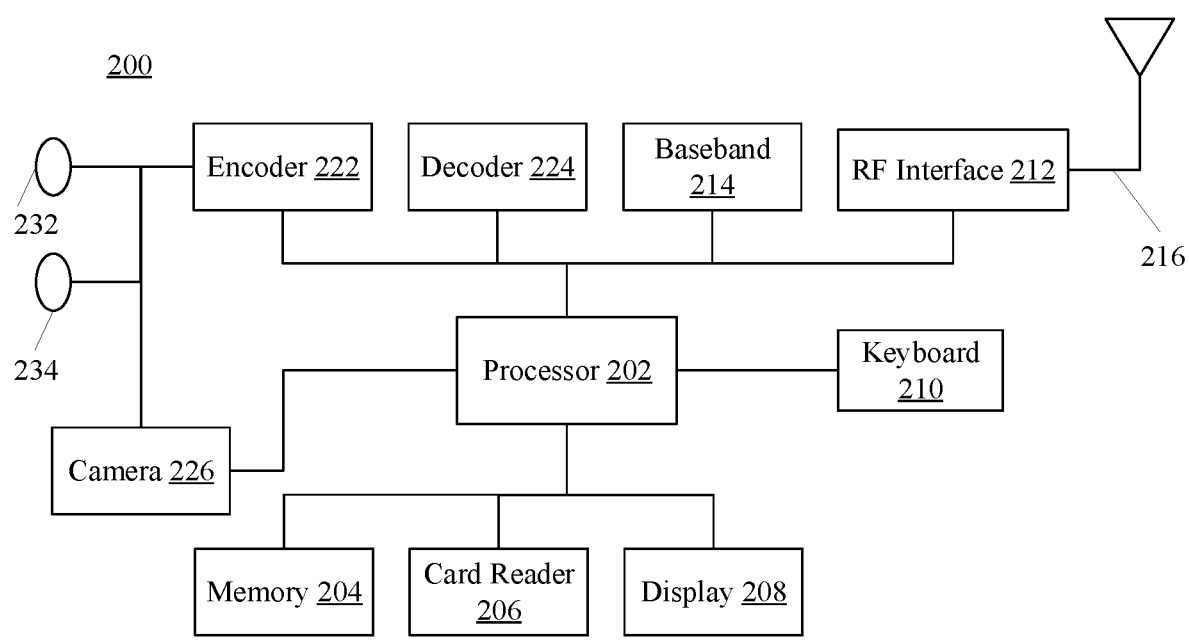
FIG. 2 illustrates a computer system consistent with certain embodiments of the present disclosure.

FIG. 2 illustrates an exemplary computer system implementing certain aspects of the variety of terminal devices 102, 104, and/or 106, and/or server 120. As shown in FIG. 2, the computer system 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the computer system 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include other types of input/output devices. The speaker 232 and the microphone 234 may be used to input and output audio for the computer system 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the computer system 200 is a portable device carried by the user, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the computer system 200 suitable for carrying out coding and decoding of audio and/or video data or assisting in coding and decoding carried out by the processor 202.

The computer system 200 as shown in FIG. 2 may also include additional structures to implement any particular system. For example, the computer system 200 may include a database, and/or a land-line based network communication interface when implementing the server 120, or may include structures similar to those of a mobile terminal or user equipment of a wireless communication system when implementing the mobile device 102, etc. However, the computer system 200 may include or omit any structure to implement any electronic device or apparatus which may require encoding and decoding, or encoding or decoding video.

Returning to FIG. 1, the computer system 200 (i.e., any one or more of the variety of devices 102, 104, and/or 106) may capture or collect various data (e.g., audio data, environment/operating data, image data, and/or video data) and send the data to the server 120 through the network 140. The computer system 200 may process or pre-process the data before sending the data to the server 120, or may send the unprocessed data to the server 120.

During operation, a user of a terminal (i.e., computer system 200) may use a video application to transmit and/or receive video content to and/or from server 120, or users of the various terminal devices may use various video applications to communicate video content with each other. In one embodiment, one user may communicate video content with another user via the server 120, or the server 120 may set up the communication channel between the users, so that one user may direct communicate video with the other user via the communication channel.

Specifically, when the terminal receives video content, because the video content may be encoded bitstream, the terminal may use a video decoder (e.g., decoder 224) to decode the bitstream such that the encoded video content can be presented by the terminal to the user of the terminal. The video content may be from a variety of video applications, such as a video conference application, a video streaming application, a video security monitoring application, or any appropriate video applications.

Figure 3:
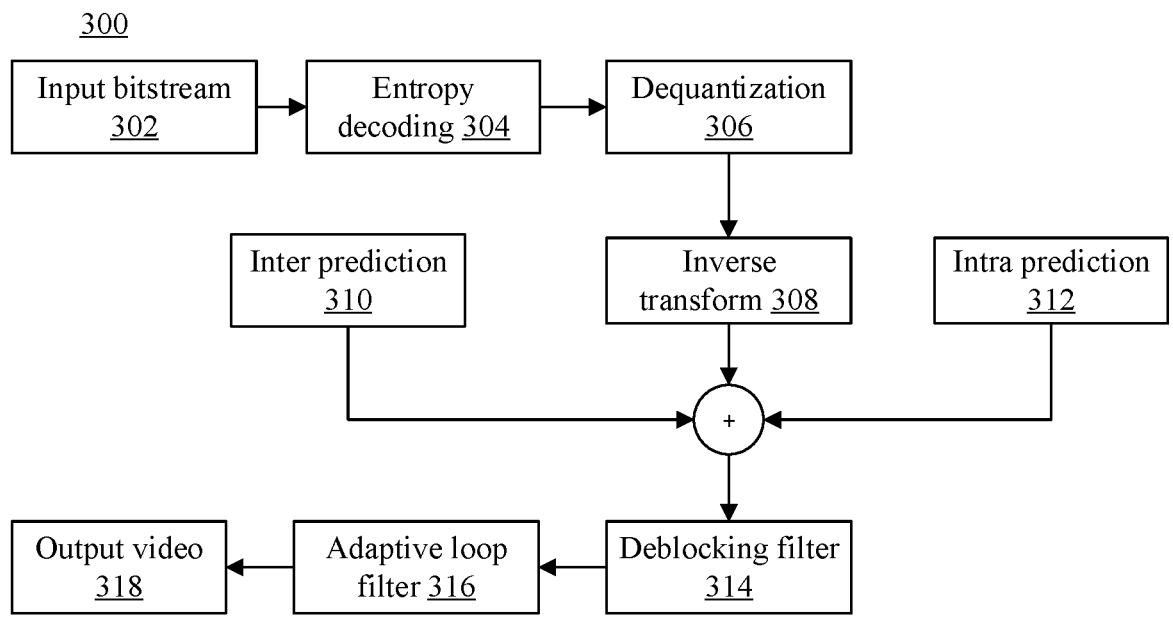
FIG. 3 illustrates an exemplary decoder structure during a decoding process consistent with certain embodiments of the present disclosure.

FIG. 3 illustrates an exemplary decoder structure during a decoding process consistent with the disclosed embodiments. As shown in FIG. 3, the video decoder 300 may include an input 302, an entropy decoding module 304, a dequantization module 306, an inverse transform module 308, an inter prediction module 310, an intra prediction module 312, a deblocking filter 314, an adaptive loop filter 316, and an output 318. Certain components may be omitted and other components may be added.

The input 302 may be provided to receive the bitstream to be decoded, and the output 318 is configured to output the decoded video picture/frame for further processing. The entropy decoding module 304 may receive the encoded bitstream and perform an initial decoding process, i.e., an entropy decoding process, on the encoded bitstream, when the bitstream may be entropy encoded. For example, an entropy encoder may create and assign a unique prefix-free code to each unique symbol that occurs in the original video content, and may then compress the video data by replacing each fixed-length data symbol with the corresponding variable-length prefix-free output codeword. The length of each codeword may be approximately proportional to the negative logarithm of the probability of occurrence of that codeword. On the other hand, the entropy decoder 304 may be a variable length decoder and may decompress the bitstream to provide entropy decoded video data.

The dequantization module 306 may be provided with the entropy decoded video data and perform a dequantization process, i.e., to dequantize the received video data. For example, the dequantization module 306 may obtain quantized coefficients and may descale the quantized coefficients.

Further, the inverse transform module 308 may be configured to perform an inverse transformation on the video blocks inputted to the inverse transform module 308. For example, the inverse transform module 308 may perform an inverse discrete cosine transform (DCT) on the video blocks.

The inter prediction module 310 may reconstruct video blocks based on inter frame prediction. An inter coded frame is divided into blocks known as macroblocks. Instead of directly encoding the raw pixel values for each block, the encoder may try to find a block similar to the one it is encoding on a previously encoded frame, referred to as a reference frame. This process can be done by a block matching algorithm. If the encoder succeeds on its search, the block could be encoded by a vector, known as motion vector, which points to the position of the matching block at the reference frame. The process of motion vector determination is called motion estimation. On the decoding side, original blocks can be recovered or reconstructed based on the reference frame and the inter frame prediction.

Further, the intra prediction module 312 may reconstruct video blocks based on intra frame prediction. On the encoding side, intra-frame prediction exploits spatial redundancy, i.e., correlation among pixels within the current picture or current frame, by calculating prediction values through extrapolation from already coded pixels for effective delta coding, with no temporal processing performed outside of the current picture or frame. On the decoding side, original blocks can be recovered or reconstructed based on the current frame and the intra frame prediction.

Further, the deblocking filter 314 may be configured to deblock the fused video frame blocks from the inverse transform module 308, the inter prediction module 310, and/or the intra prediction module 312. That is, the outputs from the inverse transform module 308, the inter prediction module 310, and/or the intra prediction module 312 may be fused together to obtain reconstruction frame blocks, and may be further subject to the deblocking filter 314. For example, the deblocking filter 314 may operate on the edges of each 4×4 or 8×8 transform block in the luma and chroma planes of each picture or frame. Further, the adaptive loop filter 316 may be configured to further improve image quality. The output video may be the decoded original video content, i.e., reconstructed original video during the decoding process, and the original video content may then be presented to the user of the terminal for display or other applications/programs for further processing.

Figure 4:
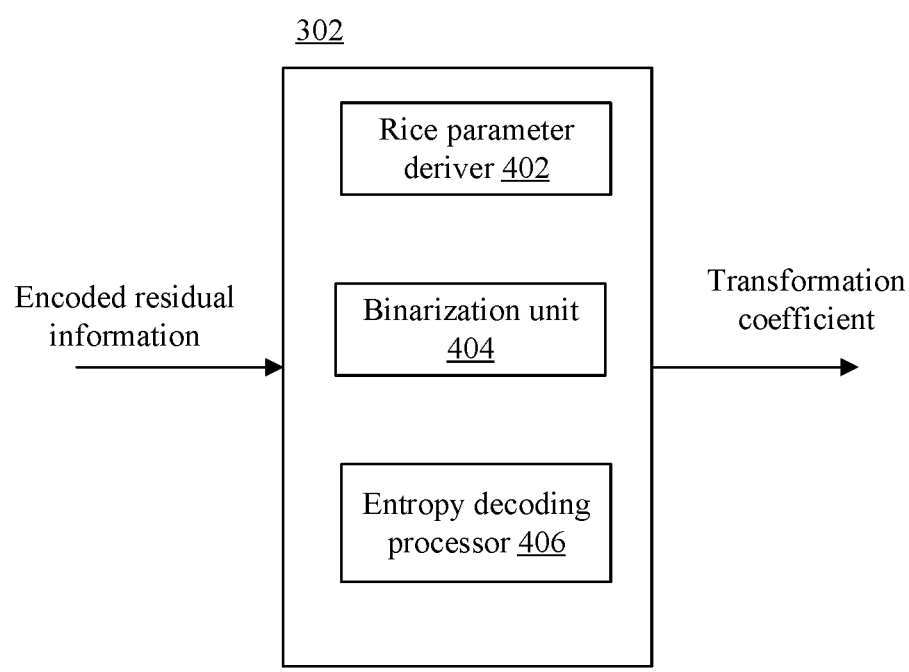
FIG. 4 illustrates an exemplary entropy decoding module consistent with certain embodiments of the present disclosure.

In certain embodiments, the bitstream may be encoded using entropy coding based on a residual coding scheme, such as Rice coding or Golomb coding. FIG. 4 illustrates an exemplary entropy decoding module consistent with the disclosed embodiment of the present disclosure. As shown in FIG. 4, the entropy decoding module 302 may include a Rice parameter deriver 402, a binarization unit 404 and an entropy decoding processor 406. Other components may also be included.

The entropy decoding module 302 may decode the encoded residual information to derive transform domain coefficients. For example, the entropy decoding module 302 may derive transform domain coefficients by decoding the residual information encoded in a current block (current CB or current TB).

Specifically, the entropy decoding module 302 may decode syntax elements for the residual information and derive transform domain coefficients by interpreting values of the syntax elements. For example, the entropy decoding module 302 (Rice parameter deriver 402) derive a Rice parameter for the syntax element abs_remainder[n], which is the remaining absolute value of a transform coefficient level that is coded with Golomb-Rice code at the scanning position n. The Rice parameter derivation may be performed based on a neighboring reference transform coefficient based on a transform skip flag that represents whether to apply transform and/or TB size The entropy decoding module 302 (binarization unit 404) may perform a binarization for the abs_remainder based on the derived Rice parameter. That is, the binarization unit 404 may derive available bin strings for available values for the abs_remainder through the binarization process for the abs_remainder. In one embodiment, based on the Rice parameter, a length of the bin string for the abs_remainder value may be adaptively determined The entropy decoding module 302 (entropy decoding processor 406) may also perform entropy decoding for the syntax elements related to residual coding including the abs_remainder. For example, the entropy decoding may be performed based on context of each of the bins in the bin string from the bitstream based on the entropy coding technique such as context-adaptive arithmetic coding (CABAC), context-adaptive variable length coding (CAVLC), or the like. In addition, the bitstream may include various types of information for image/video decoding such as prediction information in addition to the residual information.

When a block of residual pixels is entropy coded in transform domain, the Rice parameter is derived by invoking the Rice parameter derivation process for abs_remainder[ ] for residual coding of transform domain coefficients. The inputs to the Rice parameter derivation process are the base level baseLevel, the colour component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight. The outputs of the Rice parameter derivation process is the Rice parameter cRiceParam.

Figure 5:
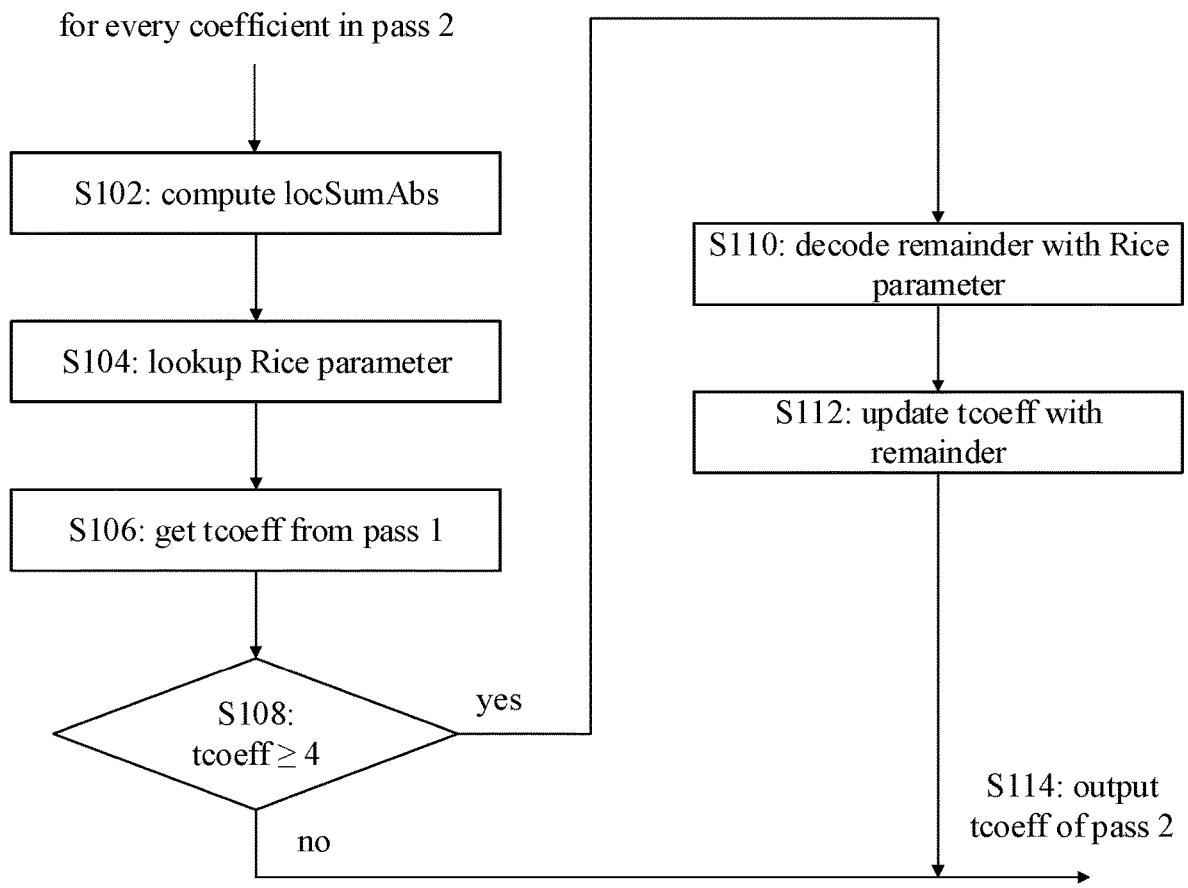
FIG. 5 illustrates a flowchart of a decoding process of a transform domain coefficient in residual coding.

FIG. 5 illustrates a schematic flowchart of a process of decoding a transform domain coefficient in residual coding.

The residual coding may include three passes, and the remainder is abs_remainder[ ], and tcoeff is AbsLevel[xC][yC], e.g., the current transform domain coefficient at the location (xC, yC). The first pass of the residual coding includes providing a transform domain coefficient according to various syntax elements, the second pass includes decoding a transform domain coefficient through abs_remainder[ ] and dec_abs_level[ ] syntax elements, and the third pass includes determining the sign of the transform domain coefficient through coeff_sign_flag[ ] syntax. The schematic flowchart shown in FIG. 5 may be a process in the second pass of the regular residual coding. Referring to FIG. 1, the remainder is abs_remainder[ ], and tcoeff is AbsLevel[xC][yC], e.g., a transform domain coefficient at a current location (xC, yC) of the transform block.

Given the array AbsLevel[x][y] for the transform block with component index cIdx and the top-left luma location (x0, y0), the variable locSumAbs can be derived as specified by the following pseudo code:

```
locSumAbs = 0
if( xC < (1 << log2TbWidth) − 1 ) {
    locSumAbs += AbsLevel[xC + 1][yC]
    if( xC < (1 << log2TbWidth) − 2 )
        locSumAbs += AbsLevel[xC + 2][yC]
    if( yC < (1 << log2TbHeight) − 1 )
        locSumAbs += AbsLevel[xC + 1][yC + 1]
}
if( yC < (1 << log2TbHeight) − 1 ) {
    locSumAbs += AbsLevel[xC][yC + 1]
    if( yC < (1 << log2TbHeight) − 2 )
        locSumAbs += AbsLevel[xC][yC + 2]
}
locSumAbs = Clip3( 0, 31, locSumAbs − baseLevel * 5 )
```

For residual coding syntax, the variable baseLevel is equal to 4. Further, given the variable locSumAbs, the Rice parameter cRiceParam is derived as specified in the following Table 1.

TABLE 1

Specification of cRiceParam based on locSumAbs

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |

Thus, when the Rice parameter cRiceParam is derived from locSumAbs, the computation of locSumAbs is defined with a maximum of 5 branches, 5 additions, 1 multiplication, 1 substation, and one clipping operation.

More specifically, referring to FIG. 5, the decoding process may be applied to obtain every transform domain coefficient in the second pass of the regular residual coding, and include the following exemplary steps. In S102, the value of locSumAbs may be calculated, and in S104, a Rice parameter may be obtained from a table (e.g., Table 1) based on the value of locSumAbs. Further, in S106, the value of tcoeff may be obtained from the first pass of the regular residual coding, and then in S108, whether the value of tcoeff is greater than or equal to 4 may be determined. In response to the value of tcoeff is less than 4, the decoding process may execute S114 to output tcoeff. In response to the value of tcoeff is greater than or equal to 4, the decoding process may decode the remainder with the Rice parameter in S110, and then update tcoeff with the reminder in S112 before sending out the updated tcoeff in S114.

Thus, as described above, the computation of the Rice parameter for encoding abs_remainder[n], without transform skip, is defined with a maximum of 5 memory access of AbsLevel[ ][ ], 5 branches, 5 additions, 1 multiplication, 1 subtraction, and 1 clipping operation. Further improvements are provided to reduce computation, i.e., to reduce the number of memory access, branches and arithmetic operations.

Figure 6:
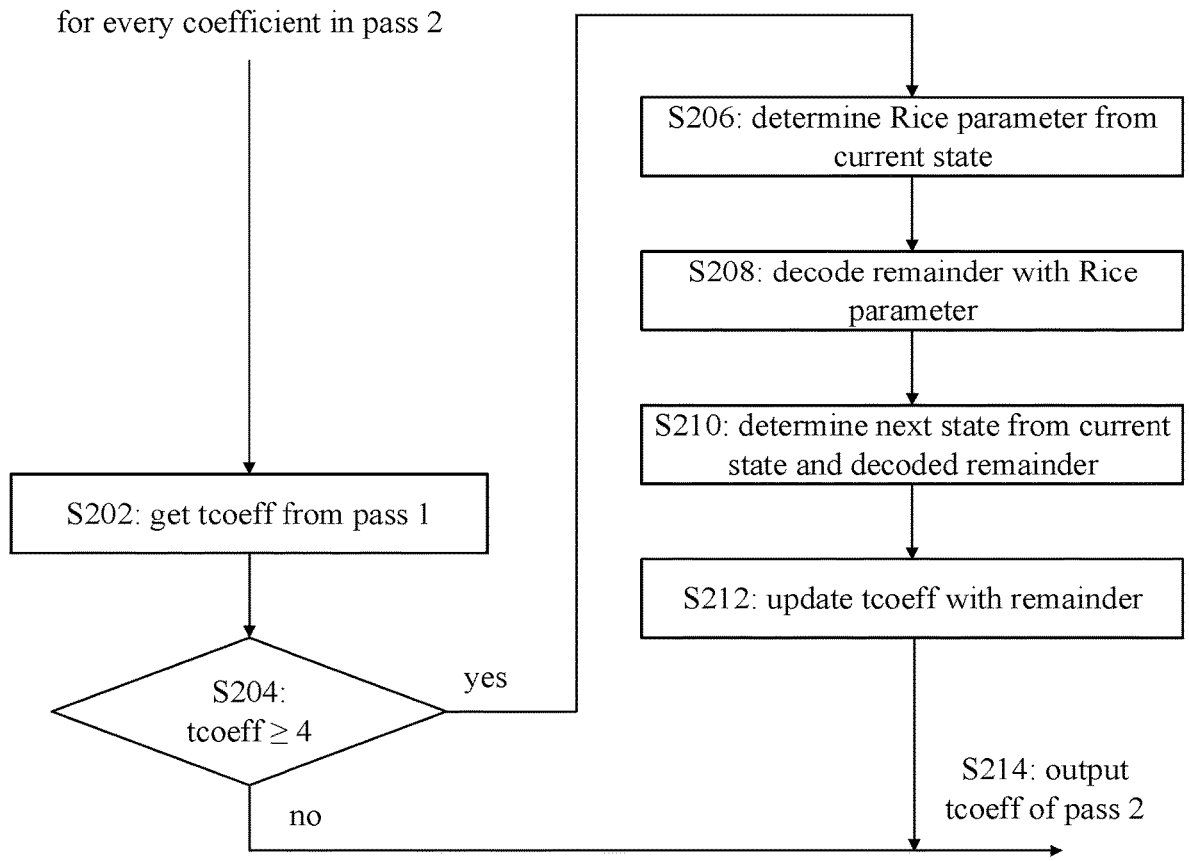
FIG. 6 illustrates a flowchart of an exemplary decoding process of a transform domain coefficient consistent with certain embodiments of the present disclosure.

In certain embodiments, the computation in the derivation of the Rice parameter for transform domain abs_remainder [n] in a subblock, which is also known as a coefficient group (CG), may be reduced to maintain coding efficiency. FIG. 6 illustrates a schematic flowchart of an exemplary decoding process of a transform domain coefficient in residual coding consistent with some embodiments of the present disclosure. This decoding process may be applied to obtain every transform domain coefficient in the second pass of the residual coding.

In the decoding process, the remainder is abs_remainder[ ], and tcoeff is AbsLevel[xC][yC], e.g., a transform domain coefficient at a current location (xC, yC) of the transform block. Comparing FIG. 6 with FIG. 5, the more computational intensive block for computing locSumAbs and the block for looking up Rice parameter in FIG. 5 may be replaced by the less computational intensive blocks which implemented a Markov decision process (MDP).

The residual decoding process may include three passes. In the first pass, the initial transform domain coefficient AbsLevel[xC][yC] may be obtained from the signaling information from syntax elements, such as the Residual coding syntax, i.e., residual_coding (x0, y0, log 2TbWidth, log 2TbHeight, cIdx), or AbsLevel[ ][ ] syntax from residual_coding ( ) etc. In the second pass, based on the initial transform domain coefficient, the MDP is performed to output the transform domain coefficient. In the third pass, the sign of the transform domain coefficient may be determined through the signaling information, such as coeff_sign_flag[ ] syntax.

In one embodiment, as shown in FIG. 6, during the second pass, the value of tcoeff may be obtained from the first pass of the residual coding (S202). Further, whether the value of tcoeff is greater than or equal to 4 may be determined (S204). When it is determined that the value of tcoeff is less than 4 (S204; no), the decoding process may output tcoeff of pass 2 (S214).

On the other hand, when it is determined that the value of tcoeff is greater than or equal to 4 (S204; yes), the decoding process may determine the Rice parameter based on the current state (S206). Further, the remainder may be decoded with the Rice parameter (S208), and the next state may be determined according to the current state and the decoded remainder (S210). The decoding process may further update tcoeff with the remainder (S212), and then output the updated tcoeff (S214).

That is, the Markov decision process (MDP) may have two parts. One part is to determine the Rice parameter (ricePar) according to the current state by an action function, i.e., action(state). The other part is to determine the next state according to the current state and the decoded remainder (rem) by a state transition function, i.e., nextSate(state, rem). The decoding process with MDP can be described by the following pseudo code, corresponding to S206, S208, and S210, respectively:

ricePar=action(state)

rem=decodeRem(ricePar)
state=nextState(state, rem)

The "state" may be initialized to a fixed value, for example, 0, at the beginning of a coefficient group.

That is, referring to FIG. 6, the action function, action (state), is depicted as the block S206 which determines Rice Parameter from the current state, and the nextState function, nextState(state, rem), is depicted as the block S210 which determines the next state from the current state and the decoded remainder.

In one embodiment, there is only one state value. In this case, the action function may be a constant and the state transition function may not be needed as in the following example:

ricePar=1
rem=decodeRem(ricePar)

In another implementation, the MDP may model a sequence of remainders with increasing variance. The MDP is intended to track the dynamic range of the remainders and use the dynamic range to select the Rice parameter as in the following example:

ricePar=(state<3 ? 0:1)
rem=decodeRem(ricePar)
state=(state<rem ? rem:state), or state=max(state, rem)

where the state is reset to zero at the beginning of a subblock, which is also known as a coefficient group.

In another embodiment, the MDP may model a sequence of remainders with a changing mean value. The MDP is intended to estimate the mean value and use it to select the Rice parameter as in the following example:

ricePar=(state<2 ? 0:1)
rem=decodeRem(ricePar)
state=(state+3*rem)>>2 where the state may be an estimated mean value by the method of exponential smoothing and the state may be reset to zero at the beginning of a subblock, which is also known as a coefficient group.

In some embodiments, the action function may be a mapping of state to Rice parameter, and thus may have various means of implementation. For example, an alternate implementation of the mapping is by means of lookup table. In some embodiments, the implementation of the mapping may be as the following:

ricePar=riceParLUT[Clip3(0, K−1, state-offset)] where K is the size of the lookup table and offset is a predetermined integer value The action function can also be by means of logics. The followings embodiments provide alternate implementations of the action function by logics:

action(state)=(state<t:a:b)
action(state)=(state<t1:a:(state<t2:b:c))
action(state)=(state<t1:a:(state<t2:b:(state<t3:c:d)))

where a, b, c, d are Rice parameters and t, $t_1$, $t_2$ are thresholds for partitioning the state values with 0≤t and 0≤$t_1$<$t_2$<$t_3$.

The first implementation of the action function listed above, i.e., action(state)=(state<t:a:b), may correspond to a case where the Rice parameter is selected from two possible values. The second implementation of the action function list above, i.e., action(state)=(state<t1:a:(state<t2:b:c)), may correspond to a case where the Rice parameter is selected from three possible values. The third implementation of the action function list above, i.e., action(state)=(state<t1:a:(state<t2:b:(state<t3:c:d))), may correspond to a case where the Rice parameter is selected from four possible values.

When a=0, b=1, the following alternate implementation of the action function action(state)=(state>=t)

in pseudo C code, which does not have branches in the Intel instruction set architecture (ISA), may correspond to the following action function action(state)=(state<t ? 0:1)

When a=0, b>0, the following alternate implementation of the action function action(state)=(state>=t)*b in pseudo C code, which does not have branches in the Intel ISA, may correspond to the following action function action(state)=(state<t ? 0:b)

When a=0, b=1, and t is a power of 2, such that t=$2^n$, and the following alternate implementation of the action function action(state)=!!(state>>n)

in pseudo C code, which does not have branches in the Intel ISA, may correspond to the following action function action(state)=(state<t?0:1)

On the other hand, the state transition function may be a mapping of the current state and the current remainder to the next state. The followings alternative implementations of state transition functions may be used:

nextState(state, rem)=(state<rem ? rem:state)
nextState(state, rem)=(a*state+b*s*rem)>>n where a, b and s are non-negative integer and (a+b)=$2^n$. The scaling parameter s is intended to provide higher precision to the thresholds in the alternate implementation of the action function. The state may be reset to zero at the beginning of a subblock, which is also known as a coefficient group.

Figure 7:
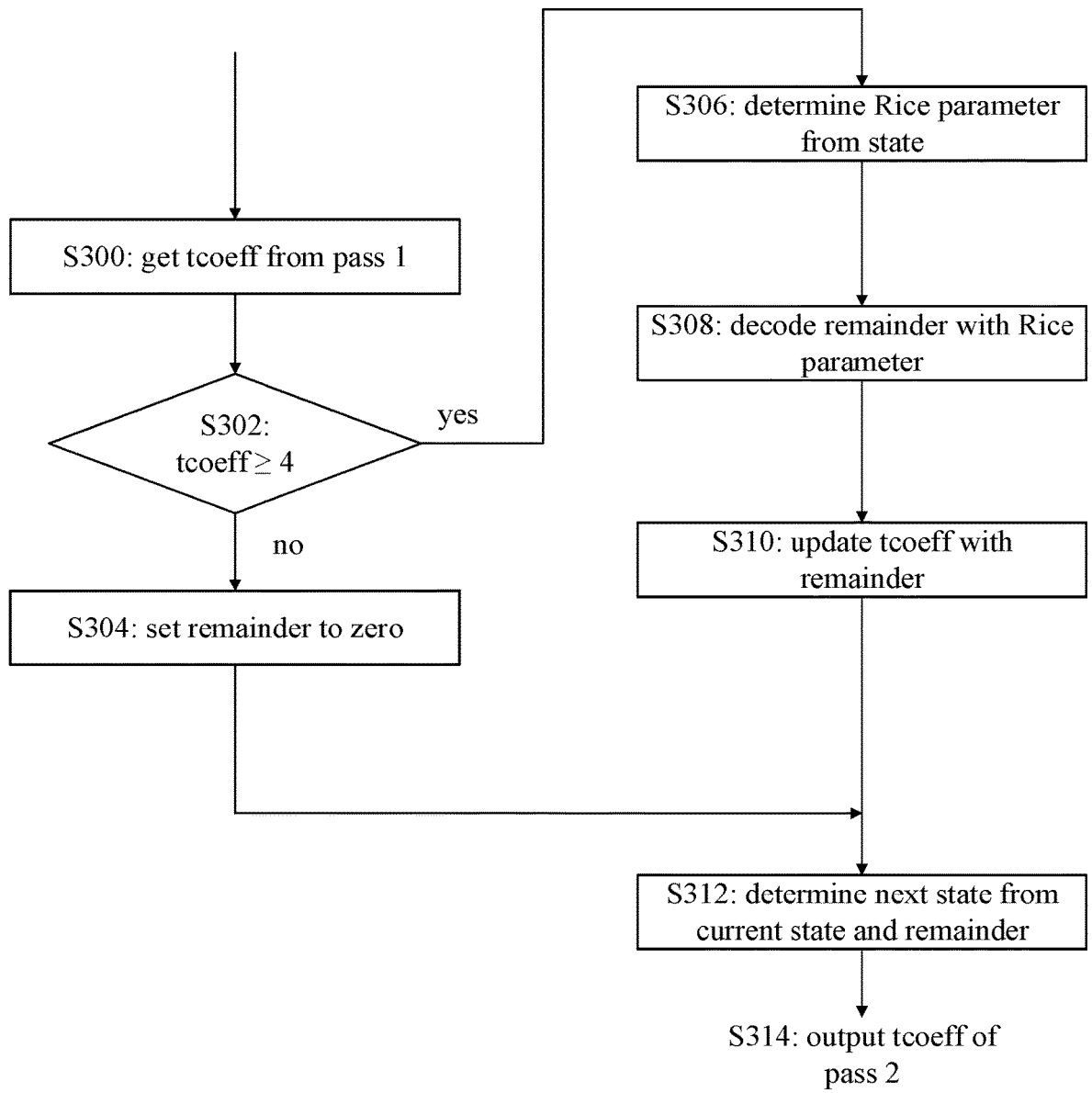
FIG. 7 illustrates a flowchart of another exemplary decoding process of a transform domain coefficient consistent with certain embodiments of the present disclosure.

FIG. 7 illustrates a schematic flowchart of another exemplary decoding process of a transform domain coefficient in residual coding consistent with embodiments of the present disclosure. In one embodiment, referring to FIG. 7, the state may be updated at every tcoeff in the second pass. That is, instead of only updating the state for tcoeff≥4 as in the decoding process shown in FIG. 6, the state may be updated at every tcoeff value.

As shown in FIG. 7, during the decoding process, the value of tcoeff may be obtained from the first pass of the residual coding (S300). Further, whether the value of tcoeff is greater than or equal to 4 may be determined (S302). When it is determined that the value of tcoeff is less than 4 (S302; no), the decoding process may set the remainder to zero (S304), and then determine the next state based on the current state and the remainder (S312) before sending out tcoeff of the second pass (S314).

On the other hand, when it is determined that the value of tcoeff is greater than or equal to 4 (S302; yes), the decoding process may determine the Rice parameter based on the current state (S306), and decode the remainder with the Rice parameter (S308). Further, tcoeff with the remainder is updated (S310). After updating tcoeff, the decoding process may determine the next state based on the current state and the remainder (S312), and then output the updated tcoeff of the second pass (S314).

Figure 8:
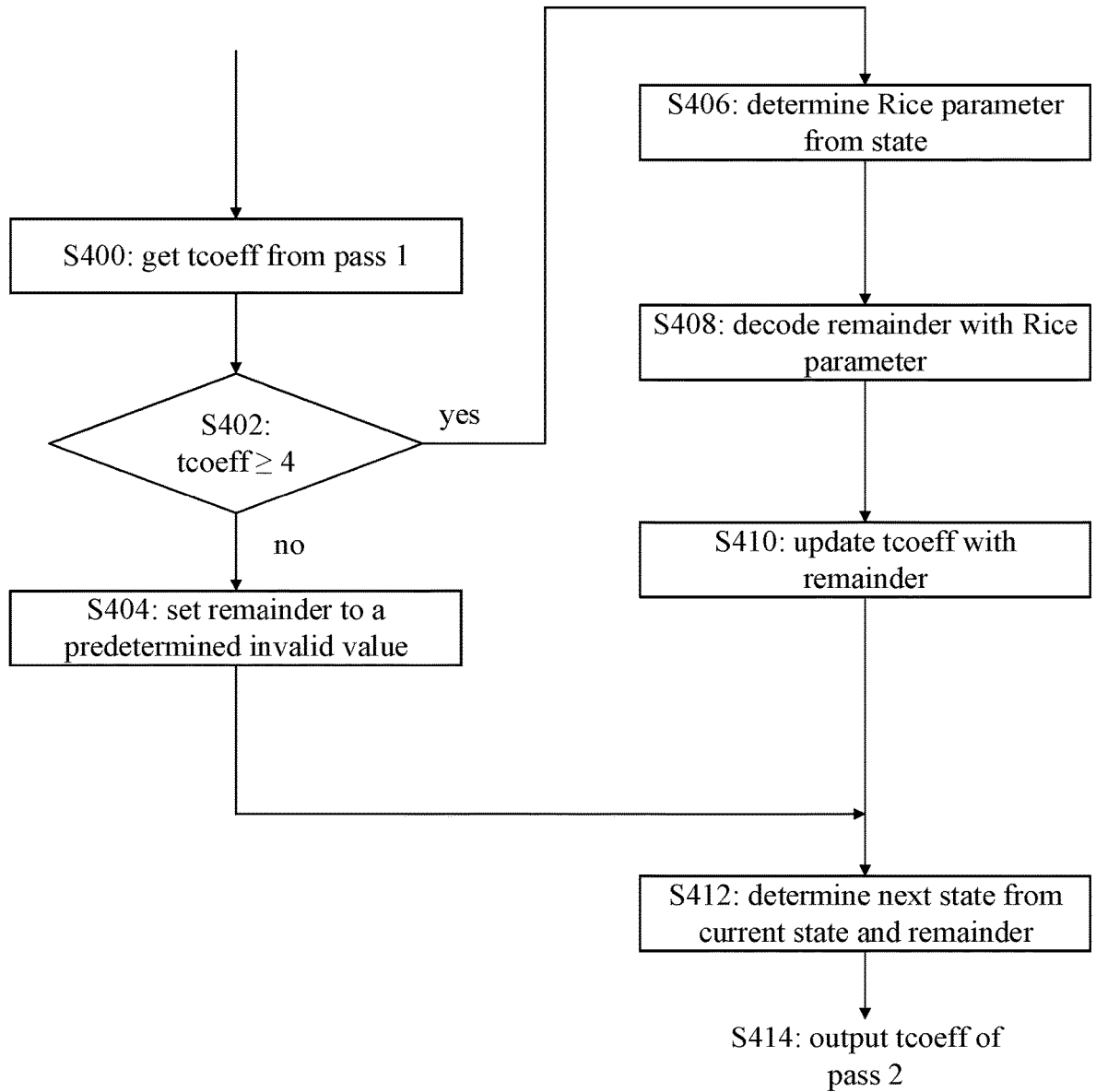
FIG. 8 illustrates a flowchart of another exemplary decoding process of a transform domain coefficient consistent with certain embodiments of the present disclosure.

FIG. 8 illustrates a schematic flowchart of another decoding process consistent with the embodiments of the present disclosure. As shown in FIG. 8, during the decoding process, the value of tcoeff may be obtained from the first pass of the residual coding (S400). Further, whether the value of tcoeff is greater than or equal to 4 may be determined (S402). When it is determined that the value of tcoeff is less than 4 (S402; no), the decoding process may set the remainder to a predetermined invalid value, for example, −1 (S404), and then determine the next state based on the current state and the remainder (S412), before sending out tcoeff of the second pass (S414).

On the other hand, when it is determined that the value of tcoeff is greater than or equal to 4 (S402; yes), the decoding process may determine the Rice parameter based on the current state (S406), decode the remainder with the Rice parameter (S408), and then update tcoeff with the remainder (S410). Further, after updating tcoeff, the decoding process may determine the next state based on the current state and the remainder (S412), and then output the updated tcoeff of the second pass (S414).

In this decoding process, although the state may be updated for every tcoeff in the second pass, the state transition function (i.e., determining the next state) may output the input state as the next state when the value of the remainder is the predetermined invalid value, and the action function (i.e., determining the Rice parameter) shown in FIG. 4 may output the same value as the action function shown in FIG. 6, in which sense that the decoding process shown in FIG. 8 may be equivalent to the decoding process shown in FIG. 6. It should be noted that the decoding methods illustrated in FIG. 7 and FIG. 8 may be used in the bit estimation of dependent quantization in the encoder where 'decode' becomes 'estimate bit of'.

Figure 9:
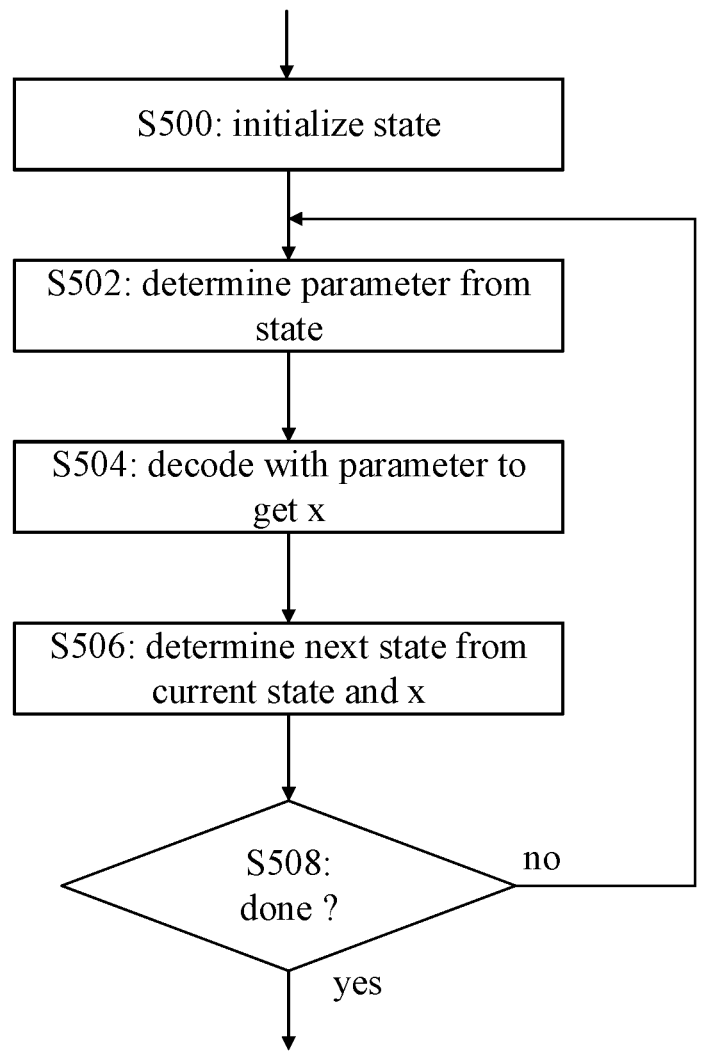
FIG. 9 illustrates a flowchart of an exemplary method of decoding a code sequence with MDP consistent with certain embodiments of the present disclosure.

The present disclosure also provides a method of decoding a sequence of uniquely decodable codes with MDP. FIG. 9 illustrates a schematic flowchart of an MDP decoding process for decoding a code sequence with MDP consistent with embodiments of the present disclosure. For decoding the code sequence with MDP, a set of uniquely decodable codes indexed by parameter k may be provided. The parameter k may be either a scaler or a vector. Further, a sequence of integers, e.g., $\{x_1, x_2, \ldots, x_n\}$ may be obtained by decoding the sequence of uniquely decodable codes with MDP.

As shown in FIG. 9, the process of decoding a sequence of uniquely decodable codes with MDP may include the followings. At the beginning, the sequence of uniquely decodable codes are obtained, and the variable state (i.e., current state) of the MDP may be initialized (S500). For example, the current state may be set to a preset value. The parameter may be determined based on the current state (S502). Further, a value of x may be obtained by decoding with the obtained parameter (S504), and the next state may be determined based on the current state and the value of x (S506). The decoding process may then determine whether decoding the code sequence is completed (S508). When the decoding is not completed (S508; no), the decoding process may returned to execute S502 to again determine the parameter based on the state obtained when executing S506 previously. As such, the decoding process may repeatedly execute S502, S504, S506, and S508 until the codes in the code sequence are all decoded.

For example, the process of decoding the code sequence indexed by the parameter k may be implemented using the following pseudo code:

Initialize state
for i from 1 to n:
k=action(state)
$x_i$=decode(k)
state=nextState(state, $x_i$)

where state can either be a scaler or a vector.

The above described MDP decoding process may be implemented based on various coding schemes, such as residual coding, Rice coding, etc. Although the present disclosure illustrates the Rice coding (e.g., the Rice parameter), other coding schemes may also be used.

Accordingly, by using the disclosed methods and systems for deriving Rice parameter for transform domain residual coding and for decoding a sequence of uniquely decodable parametric codes with MDP, coding efficiency may be improved and coding complexity may be reduced. For example, the more computational intensive process for computing locSumAbs and the process for looking up Rice parameter can be removed, and instead are replaced by the less computational intensive processes which implemented a Markov decision process (MDP). Such derivation of Rice parameter for transform domain residual coding may be able to reduce the complexity in the derivation of Rice parameter for the coding of transform domain residual subblocks.

Further, the disclosed various processing steps and components may be used separately or combined in any order. The methods (or embodiments), encoder, and decoder may be implemented by hardware processing circuitry (e.g., one or more processors or one or more integrated circuits), as well as software programs (e.g., computer program instructions executable by the hardware processor(s)).

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. Thus, the content of the specification should not be construed as a limitation to the present disclosure.

What is claimed is:

1. A video encoding method, comprising:
obtaining a video bitstream;
encoding the video bitstream based on a residual coding scheme and signaling information, wherein encoding the video bitstream comprises at least:
obtaining residual information associated with the video bitstream, wherein the residual information includes at least a remainder;
obtaining a transform coefficient based on a current state, a Rice parameter, and a next state; and
encoding the residual information based on the transform coefficient; and
outputting the encoded video bitstream.

2. The video encoding method according to claim 1, wherein encoding the video bitstream includes:
a first pass comprising obtaining an initial transform domain coefficient from the signaling information; and
a second pass comprising:
determining whether the initial transform domain coefficient is greater than or equal to a preset value;
after it is determined that the transform domain coefficient is greater than or equal to the preset value, obtaining the transform domain coefficient using a Markov decision process (MDP);
determining the next state from the current state and the remainder according to the MDP; and
outputting the transform domain coefficient.

3. The video encoding method according to claim 2, wherein obtaining the transform domain coefficient using the MDP further includes:
determining the Rice parameter using an action function with the current state as an input;
encoding the remainder with the Rice parameter to generate a remainder; and
updating the initial transform domain coefficient with the remainder to generate the transform domain coefficient.

4. The video encoding method according to claim 3, wherein determining the next state from the current state and the remainder includes:
invoking a state transition function to determine the next state corresponding to the current state and the remainder, the state transition function being a mapping of the current state and the remainder to the next state.

5. The video encoding method according to claim 4, wherein:
the MDP models a sequence of remainders with increasing variance to track a dynamic range of the sequence of remainders and to use the dynamic range to select the Rice parameter.

6. The video encoding method according to claim 4, wherein:
the MDP models a sequence of remainders with changing mean values to estimate a mean value corresponding to the next state and to use the estimated mean value to select the Rice parameter.

7. The video encoding method according to claim 4, wherein:
the state transition function includes a first non-negative integer parameter corresponding to the current state and a second non-negative integer parameter corresponding to the remainder, and a sum of the first and second parameters is a power of 2.

8. The video encoding method according to claim 7, wherein:
the state transition function further includes a scaling parameter corresponding to the remainder.

9. The video encoding method according to claim 3, wherein the second pass further includes:
initializing the current state to zero at beginning of a coefficient group.

10. The video encoding method according to claim 2, wherein:
the next state is updated from the current state and the remainder only when the it is determined that the transform domain coefficient is greater than or equal to the preset value.

11. A non-transitory computer-readable storage medium storing computer program instructions executable by at least one processor to perform:
obtaining a video bitstream;
encoding the video bitstream based on a residual coding scheme and signaling information, wherein encoding the video bitstream comprises at least:
obtaining residual information associated with the video bitstream, wherein the residual information includes at least a remainder;
obtaining a transform coefficient based on a current state, a Rice parameter, and a next state; and
encoding the residual information based on the transform coefficient; and
outputting the encoded video bitstream.

12. The non-transitory computer-readable storage medium according to claim 11, wherein encoding the video bitstream includes:
a first pass comprising obtaining an initial transform domain coefficient from the signaling information; and
a second pass comprising:
determining whether the initial transform domain coefficient is greater than or equal to a preset value;
after it is determined that the transform domain coefficient is greater than or equal to the preset value, obtaining the transform domain coefficient using a Markov decision process (MDP);

determining the next state from the current state and the remainder according to the MDP; and outputting the transform domain coefficient.

13. The non-transitory computer-readable storage medium according to claim 12, wherein obtaining the transform domain coefficient using the MDP includes:

determining the Rice parameter using an action function with the current state as an input;

encoding the remainder with the Rice parameter to generate a remainder; and updating the initial transform domain coefficient with the remainder to generate the transform domain coefficient.

14. The non-transitory computer-readable storage medium according to claim 13, wherein determining the next state from the current state and the remainder includes:

invoking a state transition function to determine the next state corresponding to the current state and the remainder, the state transition function being a mapping of the current state and the remainder to the next state.

15. The non-transitory computer-readable storage medium according to claim 14, wherein:

the MDP models a sequence of remainders with increasing variance to track a dynamic range of the sequence of remainders and to use the dynamic range to select the Rice parameter.

16. The non-transitory computer-readable storage medium according to claim 14, wherein:

the MDP models a sequence of remainders with changing mean values to estimate a mean value corresponding to the next state and to use the estimated mean value to select the Rice parameter.

17. The non-transitory computer-readable storage medium according to claim 14, wherein:

the state transition function includes a first non-negative integer parameter corresponding to the current state and a second non-negative integer parameter corresponding to the remainder, and a sum of the first and second parameters is a power of 2.

18. The non-transitory computer-readable storage medium according to claim 17, wherein the state transition function further includes a scaling parameter corresponding to the remainder.

19. The non-transitory computer-readable storage medium according to claim 13, wherein the second pass further includes:

initializing the current state to zero at beginning of a coefficient group.

20. The non-transitory computer-readable storage medium according to claim 12, wherein:

the next state is updated from the current state and the remainder only when the it is determined that the transform domain coefficient is greater than or equal to the preset value.

* * * * *